(12) United States Patent
Tutikawa

(10) Patent No.: US 6,909,597 B2
(45) Date of Patent: Jun. 21, 2005

(54) PORTABLE COMPUTER

(76) Inventor: Yoshiji Tutikawa, 7-20, 3-chome, Hiranonishi, Hirano-ku, Osaka-shi, Osaka (JP)

( * ) Notice: Subject to any disclaimer, the term of this patent is extended or adjusted under 35 U.S.C. 154(b) by 0 days.

(21) Appl. No.: 10/399,311

(22) PCT Filed: Oct. 17, 2001

(86) PCT No.: PCT/JP01/09129

§ 371 (c)(1),
(2), (4) Date: Sep. 17, 2003

(87) PCT Pub. No.: WO02/33526

PCT Pub. Date: Apr. 25, 2002

(65) Prior Publication Data

US 2004/0042163 A1 Mar. 4, 2004

(30) Foreign Application Priority Data

Oct. 18, 2000 (JP) ........................................ 2000-318632

(51) Int. Cl.⁷ ................................................ G06F 1/16
(52) U.S. Cl. ........................ 361/681; 361/683; 361/727; 345/1.1; 345/1.3; 345/169; 349/58
(58) Field of Search .................................. 361/681–685, 361/724–729; 348/822, 825, 826; 353/119–122; 345/169, 905, 1.1–1.3; 312/223.1, 223.2; 248/917, 918

(56) References Cited

U.S. PATENT DOCUMENTS

| | | | | |
|---|---|---|---|---|
| 5,490,039 A | * | 2/1996 | Helms | 361/683 |
| 5,745,340 A | * | 4/1998 | Landau | 361/681 |
| 6,262,785 B1 | * | 7/2001 | Kim | 349/58 |
| 6,295,038 B1 | * | 9/2001 | Rebeske | 345/1.1 |
| 6,487,068 B1 | * | 11/2002 | Rahemtulla | 361/681 |
| 6,489,932 B1 | * | 12/2002 | Chitturi et al. | 345/30 |
| 6,643,124 B1 | * | 11/2003 | Wilk | 361/681 |
| 6,700,773 B1 | * | 3/2004 | Adriaansen et al. | 361/680 |

* cited by examiner

Primary Examiner—Lynn Feild
Assistant Examiner—Anthony Q. Edwards
(74) Attorney, Agent, or Firm—Wood, Phillips, Katz, Clark & Mortimer

(57) ABSTRACT

A portable computer has a computer body (1), a lid (3) with an inner face having formed in it a first liquid crystal display (2), and a hinge (4) connecting the computer body (1) to the lid (3) that is capable of being folded onto the body. The computer further has a second liquid crystal display (5) normally stored in the computer body (1) and capable of being pulled out sideways from it, so that the displays (2) and (5) will form an integral liquid crystal display of a larger area.

9 Claims, 5 Drawing Sheets

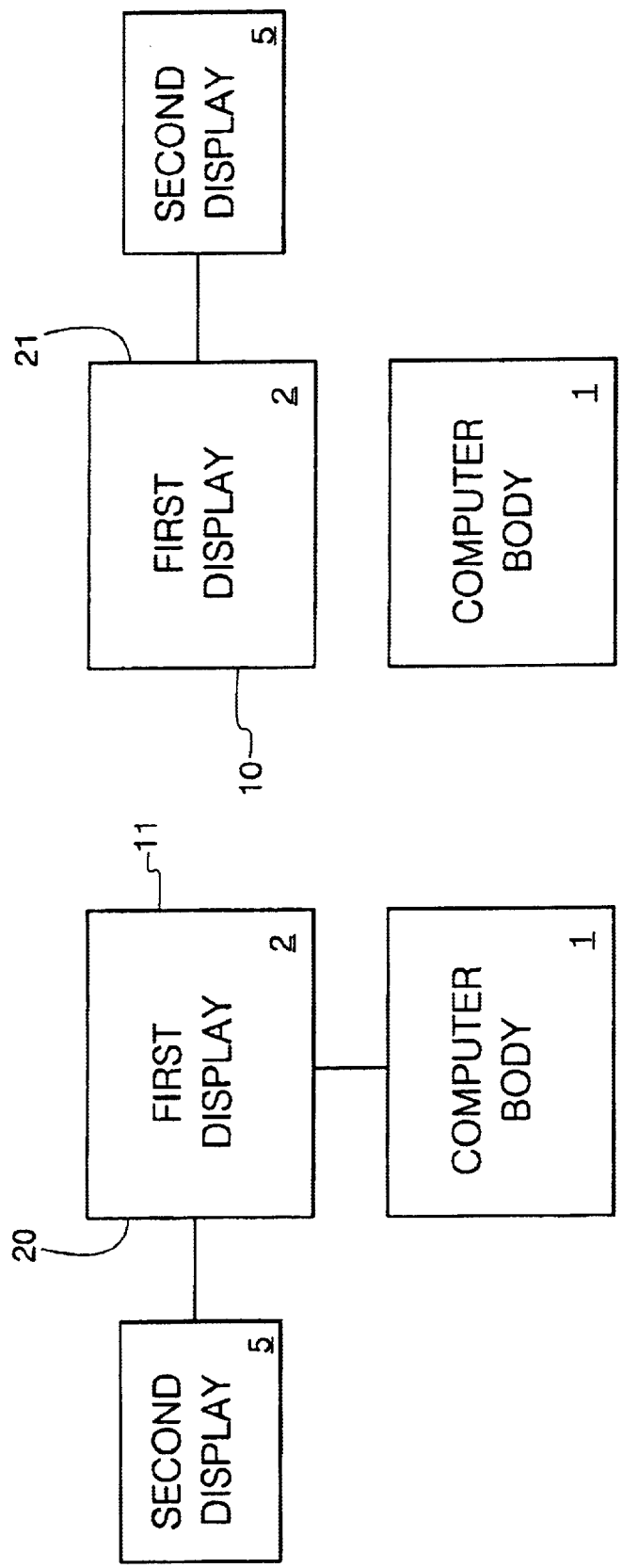

PORTABLE COMPUTER

FIELD OF THE INVENTION

The present invention relates to a portable computer that comprises a computer body and a lid with an inner face, with the inner face having a liquid crystal display formed therein, wherein the lid is capable of being pivotally folded onto and opened away from the computer body.

BACKGROUND OF THE INVENTION

Recently, portable telephones have been made smaller and smaller in size to be more convenient to carry. On the other hand, supplementary functions have been added to the normal ones of each portable computer serving as a terminal output equipment for receiving information through INTERNET and/or from the like data source.

A primary object of the present invention is to provide a portable com-puter that has a second liquid crystal display in addition to a conventional liquid crystal display, such that whilst the computer can operate as usual and as it is, the second display that has been stored in the computer body may be pulled out and exposed to form together with the conventional display an extended displaying area.

DISCLOSURE OF THE INVENTION

In order to achieve this object, the present invention employs the fol-lowing technical features. A portable computer provided herein comprises a computer body 1, a lid 3 with an inner face having a first liquid crystal display 2 formed therein, a hinge 4 connecting the computer body 1 to the lid 3 capable of being folded thereon, and a second liquid crystal display 5 normally stored in the computer body 1 and capable of being pulled out sideways therefrom if necessary.

The second liquid crystal display 5 may be fully separable from the computer body 1 such that it can be detachably connected to one of the edge portions of the first liquid crystal display 2. For example, an upper edge portion of the first display 2 may serve for connection of second, display 5 by a dovetail groove or the like means 9 as shown in FIG. 2. In this state, the main display 2 of the computer body and the supplementary one 5 are included in one and the same plane so as to form a larger and integral displaying area.

Alternatively, a tray-shaped drawer 6 may be employed that can be withdrawn from the side of computer body 1 as shown in FIGS. 3 and 4. In this case, the second liquid crystal display 5 will be pivoted by a further hinge 7 so as to swing up and down around one side of such a tray or drawer 6, wherein the further hinge 7 extends in parallel with the first-mentioned hinge 4.

BRIEF DESCRIPTION OF THE DRAWINGS

FIG. 5 is a schematic representative of a portable computer provided in another embodiment of the present invention; and FIG. 6 is a view as in FIG. 5 of a further embodiment of the present invention.

DETAILED DESCRIPTION OF THE INVENTION

Figure 1:
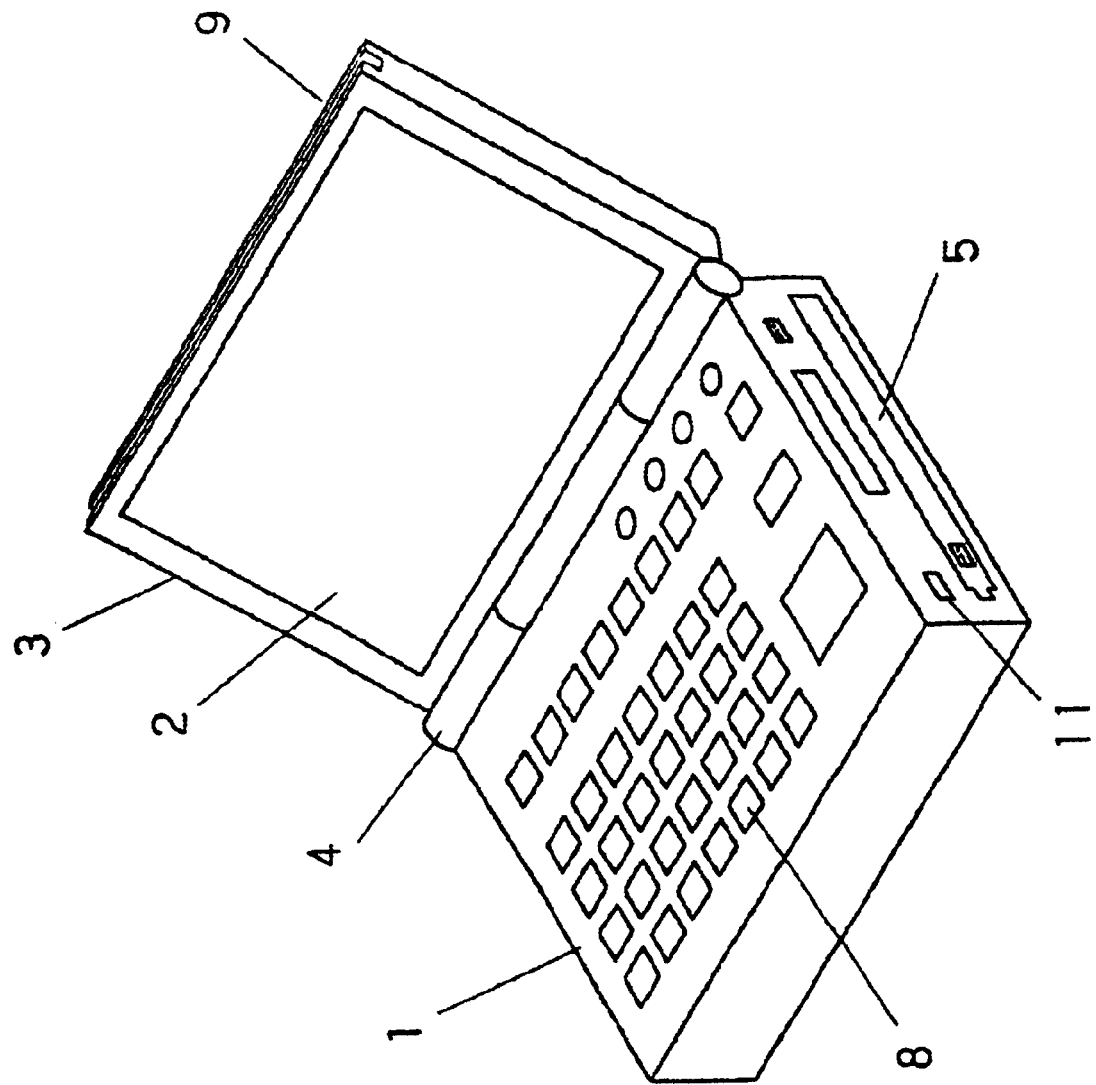
FIG. 1 is a perspective view of a portable computer provided in a first embodiment of the present invention.
Figure 2:
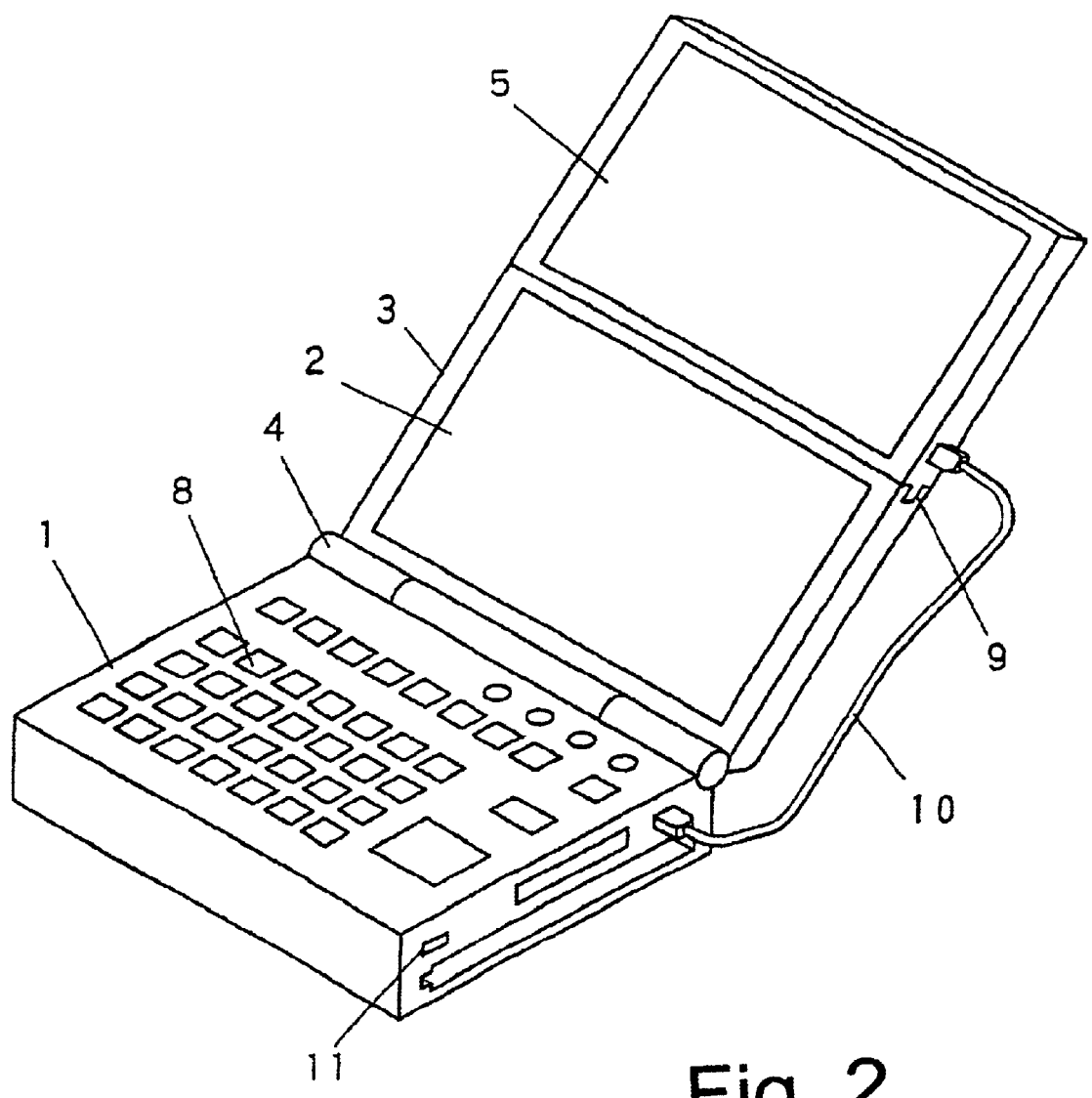
FIG. 2 is a perspective view of the computer of FIG. 1 shown in use.

Structural features of the present invention will now be described referring to embodiments shown in the drawings. FIGS. 1 and 2 illustrate a portable computer provided in a first embodiment, wherein the reference numeral 1 generally denotes a computer body. A hinge 4 connects this computer body to a lid 3, rendering it foldable onto the upper face of said body and upwardly therefrom to an operative position. A first or main liquid crystal display 2 is formed in the inner face of the lid 3, and a plurality of manipulative buttons 8 and the like are disposed in the upper face of computer body 1, all similarly to conventional portable computers.

A second or supplementary liquid crystal display 5 accommodated in the computer body 1 can be pulled out from a side thereof, as by translational movement, if and when necessary. The second display 5 in this embodiment is a discrete member fully separable from the computer body. A dovetail groove or a like fixing means 9 will be used to detachably attach the second display 5 to the upper edge portion of a peripheral edge of the first display 2 which additionally includes spaced side edge portions and a bottom edge portion at which the hinge 4 is located. The first and second liquid crystal displays 2 and 5 thus combined with each other extend in a single and common plane to provide a united and enlarged image-displaying area. The reference numeral 10 in FIG. 2 denotes a link cable for electrically connecting the first display 2 of computer body 1 to the second display 5, whereby the second display 5 can be operated in a state fully separated from the computer body 1. An ejection button 11 disposed in the computer body is preferably used to mechanically eject the second display, though it may be pulled out manually.

If the portable computer is used for the purpose of word processing, then only the first display 2 will work as shown in FIG. 1 because it suffices well to treat with data of a relatively small volume as in the conventional cases. If in contrast any information of a much larger volume is to be displayed, then the second display 5 withdrawn from the computer body 1 will be combined with the first display 2 to thereby form a large-scaled integral display area.

Figure 3:
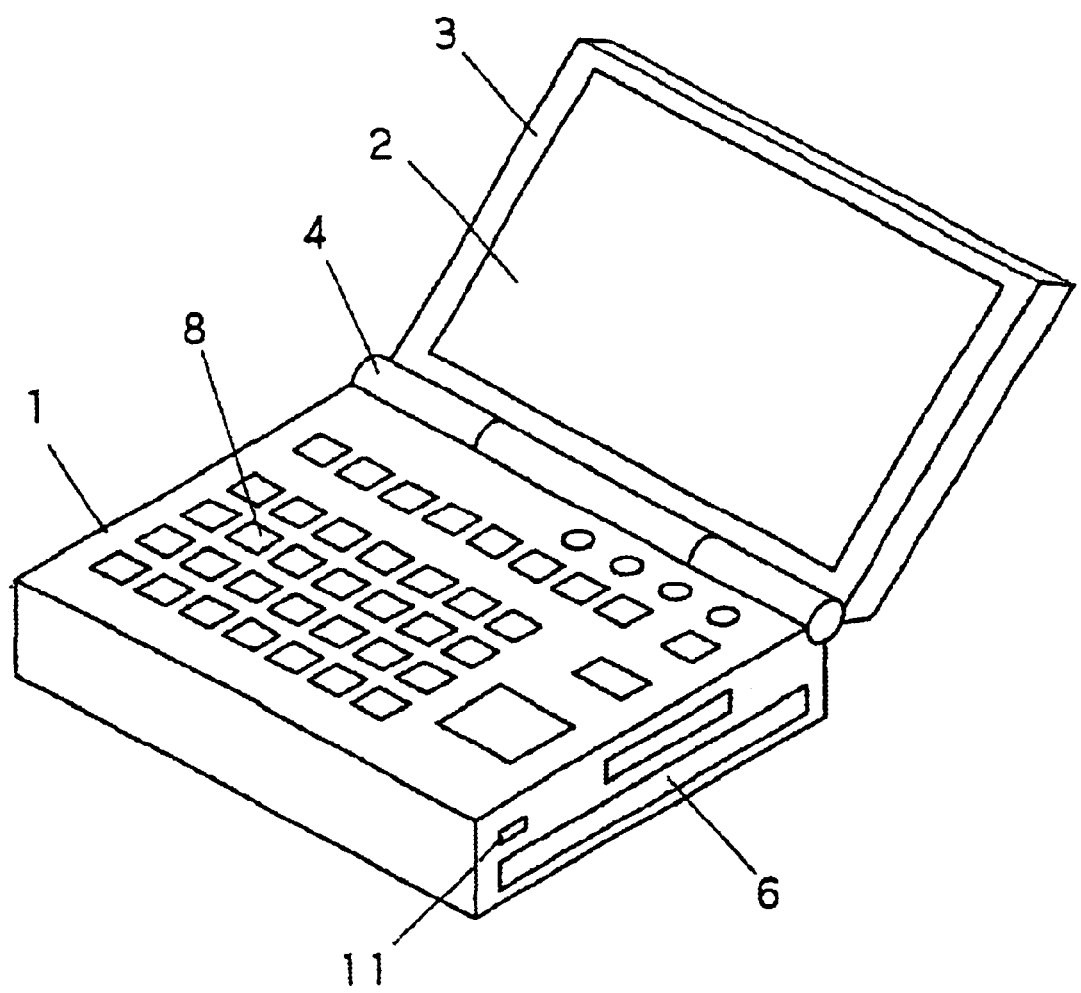
FIG. 3 is a perspective view of a portable computer provided in a second embodiment of the present invention.
Figure 4:
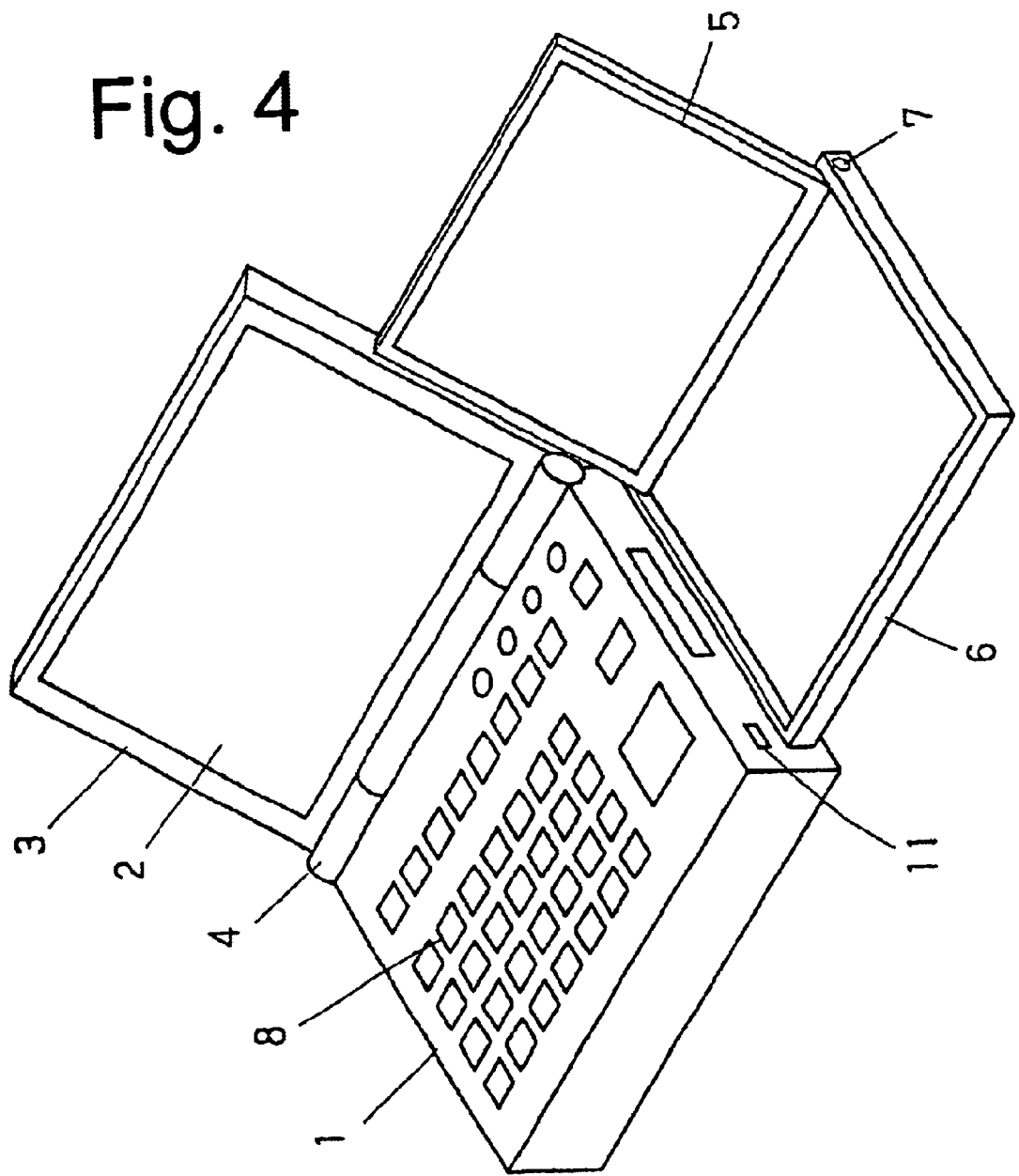
FIG. 4 is a perspective view of the computer of FIG. 3 shown in use.

FIGS. 3 and 4 show a second embodiment, wherein a tray-shaped drawer 6 is accommodated in the side of computer body 1 and the second display 5 is mounted on such a drawer 6. The drawer 6 has a hinge 7 lying in parallel with the first-mentioned hinge 4 so that the second display 5 can be operated to rotate up and tilt down relative to the drawer. At a raised position of the second display 5 thus raised will be set at the same angle as that at which the first liquid crystal display 2 is positioned relative to the computer body 1. Also in this embodiment, only the first display 2 will work as shown in FIG. 3 if and when the portable computer is used for the purpose of word processing treating with data of a relatively small volume as in the conventional cases. If contrarily any information of a much larger volume is to be displayed, then the second display 5 will be caused to take its raised position cooperating with the first display 2 to thereby form a large-scaled integral display area. Also in this embodiment, an ejection button 11 disposed in the computer body is preferably used to mechanically eject the drawer 6 carrying the second display 5, though it may manually be pulled out.

The representative embodiments of the invention described above do not delimit the scope thereof. For example, the dovetail structure shown in FIGS. 1 and 2 for connection of the second display 5 to the first one 2 of computer body 1 may be replaced with any proper steel fastener or the like. Further, the second display 5 may not necessarily be disposed above the upper edge portion of the computer body first display 2 but may be arranged side by side to either lateral side edge portion thereof 20, 21 as shown in FIG. 5. The embodiments may further be modified in many manners, provided that any similar constituent parts of the same effects are employed to achieve the described object, affording the following advantages.

ADVANTAGES OF THE INVENTION

The first display will solely work if and when the portable computer is used to perform the word processing or the like work treating with data of a relatively small volume as in the conventional cases. If contrarily any information of a much larger volume including characters and/or figures is to be displayed simultaneously, then the second display will be withdrawn to cooperate with the first display of computer body to thereby form a large-scaled integral display area.

What is claimed is:

1. A portable computer comprising: a computer body, a lid with an inner face having a first liquid crystal display formed therein, a hinge connecting the computer body to the lid so that the lid is selectively folded onto said body and outwardly through the hinge to an operative position, and a second liquid crystal display normally stored in the computer body, the lid in the operative position having a peripheral edge comprising upper, lower, and spaced side edge portions, the second liquid crystal display separable from the computer body being connected to the peripheral edge by a cooperating fixing structure on the peripheral edge and the second liquid crystal display, respectively.

2. The portable computer according to claim 1 wherein the second liquid crystal display is capable of being connected to the peripheral edge so that the first and second liquid crystal displays extend in a single and common plane.

3. The portable computer according to claim 1 wherein the second liquid crystal display is capable of being connected to any one of the upper and spaced side edge portions.

4. The portable computer according to claim 1 wherein the computer body has spaced sides and the second liquid crystal display is separable from the computer body by being pulled out through one of the sides.

5. The portable computer according to claim 4 wherein the second liquid crystal display is separable from the computer body by being pulled therefrom by relative translational movement.

6. The portable computer according to claim 1 wherein the second liquid crystal display is capable of being connected to the peripheral edge so that the first and second liquid crystal displays cooperatively define a united, enlarged, image or displaying area.

7. The portable computer according to claim 1 wherein the second liquid crystal display can be operated with the second liquid crystal display fully separated from the computer body and the first liquid crystal display.

8. The portable computer according to claim 7 wherein the second liquid display is electrically connected by a link cable with the second liquid crystal display fully separated from the computer body and the first liquid crystal display.

9. A portable computer comprising: a computer body with spaced sides and a front and rear, a lid with an inner face having a first liquid crystal display formed therein, a first hinge connecting the computer body to the lid so that the lid is folded onto said body, and a second liquid crystal display normally stored in the computer body, wherein the second liquid crystal display is mounted on a tray-shaped drawer pulled out from one of the sides of the computer body and connected to the drawer by a further hinge extending in parallel with the first hinge.

* * * * *